April 19, 1955     E. W. JOHNSTON     2,706,340
PROFILE TRACING MACHINE
Original Filed Oct. 12, 1949     4 Sheets-Sheet 2
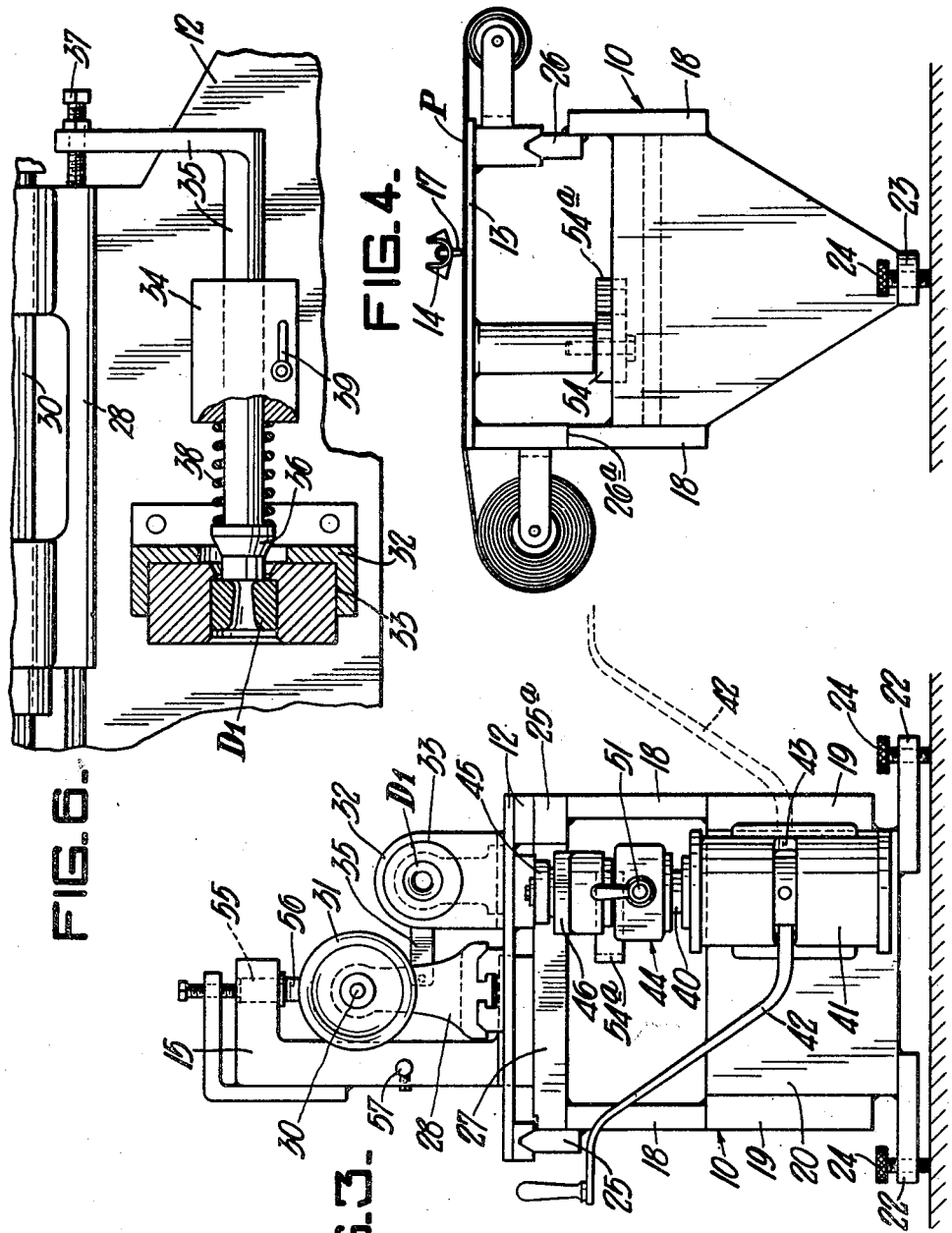
Inventor:
EARL W. JOHNSTON,
by: Donald G. Dalton
his Attorney.

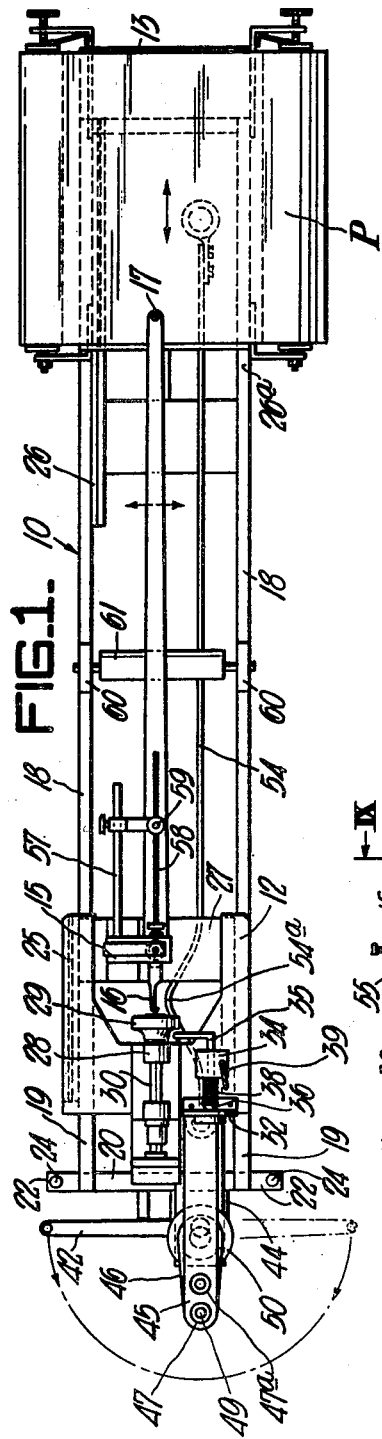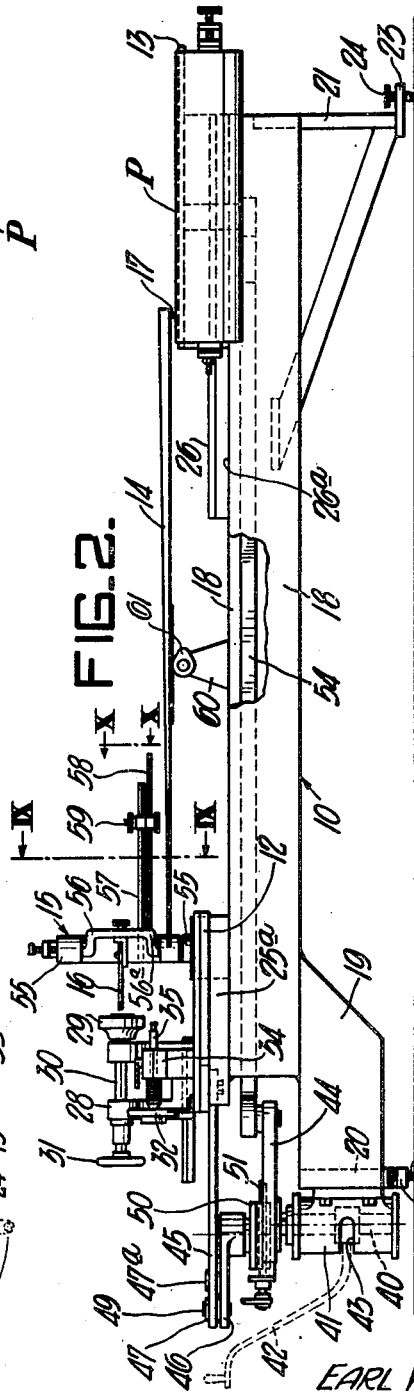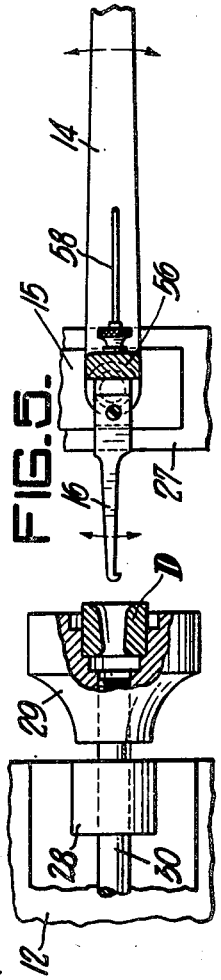

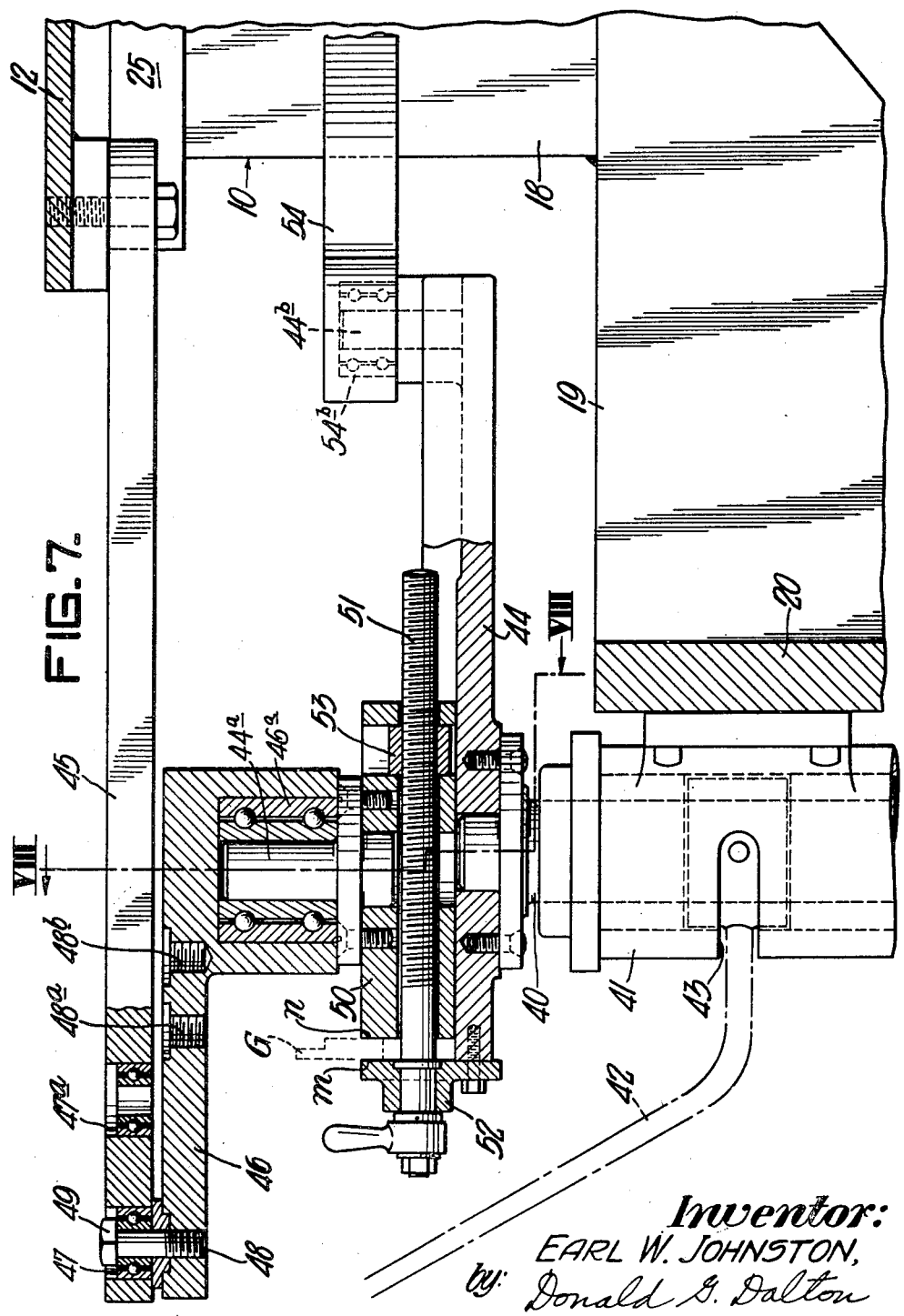

April 19, 1955 E. W. JOHNSTON 2,706,340
PROFILE TRACING MACHINE
Original Filed Oct. 12, 1949 4 Sheets-Sheet 4
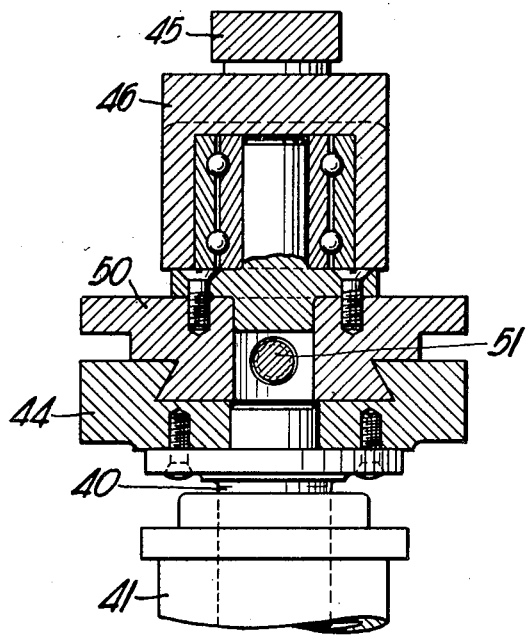
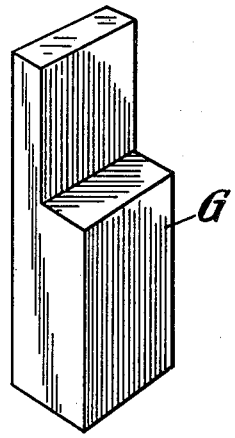
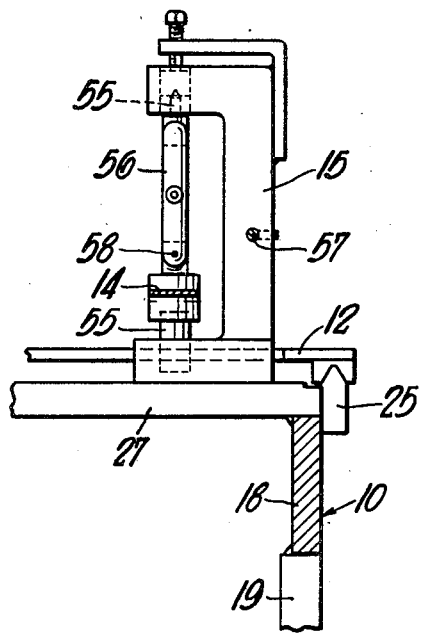
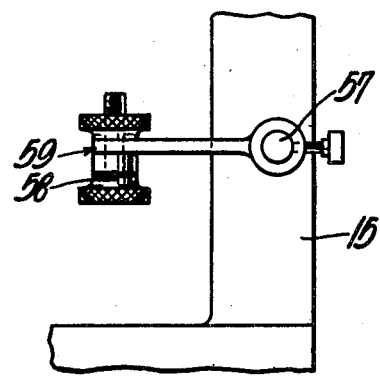
Inventor:
EARL W. JOHNSTON,
by Donald G. Dalton
his Attorney.

United States Patent Office

2,706,340
Patented Apr. 19, 1955

2,706,340

PROFILE TRACING MACHINE

Earl W. Johnston, Worcester, Mass., assignor to United States Steel Corporation, a corporation of New Jersey Original application October 12, 1949, Serial No. 120,999, now Patent No. 2,654,951, dated October 13, 1953. Divided and this application October 31, 1952, Serial No. 317,935

5 Claims. (Cl. 33—181)

This invention relates to machines for tracing profiles especially of wire drawing dies, although obviously similar machines can be used for tracing profiles of other articles.

The present application is a division of my earlier copending application, Serial No. 120,999, filed October 12, 1949, now Patent No. 2,654,951, issued Oct. 13, 1953.

Wire drawing dies have nibs of hard material which contain a central passage through which wire is drawn to effect a size reduction. The size and shape of this passage should conform to certain known standards. Satisfactory instruments already are available for measuring the diameter and the roundness of this passage. The invention described and claimed in my aforesaid application affords a machine for tracing on an enlarged scale the longitudinal profile of such passages and thereby facilitates measurement of their interior angles and longitudinal dimensions. The present invention affords a means for positioning dies in such machines to enable the machine to trace a full profile.

An object of the invention is to provide a positioning device which automatically sets up a profile tracing machine for any die so that the die nib is in a predetermined location irrespective of variations in the position of the nib with respect to the die casing.

A more specific object is to provide an improved die positioning device which includes means for temporarily mounting a die and a movable gauging rod adapted to abut first the die nib and then the permanent mounting means of the tracing machine for accurately positioning the latter mounting means in accordance with the relative position of the nib in the casing.

In accomplishing these and other objects of the invention, I have provided improved details of structure, a preferred form of which is shown in the accompanying drawings, in which:

Figure 1 is a top plan view of a profile tracing machine which embodies the improved positioning device of the present invention;

Figure 2 is a side elevational view of the machine;

Figures 3 and 4 are end elevational views from the left and right respectively;

Figure 5 is an enlarged top plan view, partly in section of the die, die holder and tracing point;

Figure 6 is an enlarged top plan view, partly in section of the positioning device;

Figure 7 is an enlarged side elevational view partly in section of the linkage which moves the slide and the platen;

Figure 8 is a vertical sectional view taken substantially on line VIII—VIII of Figure 7;

Figures 9 and 10 are vertical sectional views taken substantially on lines IX—IX and X—X of Figure 2; and Figure 11 is a perspective view of a gauge block which can be used conveniently in conjunction with the machine.

The tracing machine comprises a base 10 which supports a die mounting slide 12 and a platen 13. The die mounting slide is situated adjacent the left end of the base and the platen adjacent the right end, as viewed in Figures 1 and 2. The die mounting slide has mechanism hereinafter described for mounting a die D while the machine traces a profile of its passage. In the example of a wire drawing die, the die D normally would include the usual outer steel casing and central nib of harder material fixed in said casing, but for simplicity Figure 5 shows this die schematically as a single piece. Figure 6, hereinafter described, shows such a die as actually constructed. A linkage hereinafter described has a pivotal connection to the base and is connected to the slide and platen. This linkage furnishes a means for moving both the slide and platen with the platen moving proportionately to the slide, but through a much greater distance. The linkage illustrated moves the slide and platen in opposite directions. The ratio of travel between the platen and the slide determines the enlargement of the tracing in the longitudinal direction.

A tracing lever 14 is pivoted on the base between the platen and the slide on an upright post 15 and turns on an approximately vertical fixed axis. Said lever is illustrated as having a short lever arm to the left of its pivot and a much longer lever arm to the right. The ratio of the lengths of these arms is the same as the ratio of travel between the slide and the platen, and this ratio determines the scale of enlargement of the tracing in the transverse direction. The short lever arm carries a tracing point 16 which follows the profile of die D as the latter moves longitudinally. The long lever arm carries a marking device 17 which traces this profile on a roll of paper P which the platen carries. The details of the mounting means for these parts are described more fully hereinafter.

Base 10 includes longitudinal side members 18 which are offset downwardly at the end of the machine adjacent the slide, as indicated at 19 (Figure 2). End cross members 20 and 21 connect said side members, preferably being welded thereto to furnish a rigid structure. End member 20, which is adjacent the offset, carries two outwardly extending legs 22 and end member 21, which is adjacent the other end, carries a single centrally located leg 23. Each of these three legs carries an adjusting screw 24 for leveling the machine or canting it slightly, as hereinafter explained. The upper edges of side members 18 carry guides 25 and 25a for the slide, guides 26 and 26a for the platen, and a transverse piece 27 which mounts pivot 15 for the tracing lever 14.

The slide preferably is U-shaped in plan (Figure 1). The pivotal mounting 15 of tracing lever 14 is situated between the arms of the U. The slide carries an upright bearing stand 28 which supports a die holder holder 29. Preferably this holder is of the draw type, having a three-point chuck for holding dies D. A spindle 30 and a hand wheel 31 operate said die holder to clamp and release dies. Since the die holder per se can be of any known construction, no detailed description is deemed necessary.

Figures 1, 2 and 7 show the starting position of the operating linkage for the slide and platen. With particular reference to Figure 7, this linkage includes a main shaft 40 which is journaled for rotation on an approximately vertical axis within a bearing 41 fixed to the end cross member 20 of the base. A handle 42 is fixed to the mid-portion of said shaft and rides in an approximately 180° slot 43 in the side wall of said bearing. A crank arm 44 is fixed to the upper end of shaft 40 and projects both to the left and to the right therefrom. Referring back to Figure 1, it is seen that in the starting position handle 42 is in its extreme clockwise position and crank arm 44 extends parallel to the direction of travel of the slide and platen.

Slide 12 has a tongue portion 45 fixed to its left end. A relatively short connecting rod 46 is pivotally connected both to the crank arm 44 and to said tongue. The pivotal connection of this connecting rod to the crank arm 44 includes a crank pin 44a which is non-rotatably mounted on said crank arm and in the starting position of the linkage is to the left of shart 40. The eccentricity of crank pin 44a with respect to shaft 40 is relatively small and is adjustable. The adjustable mounting includes a tool slide 50 which is slidable along the upper face of crank arm 44 and to which pin 44a is fixed. A spindle 51 is journaled in a bearing 52 in the left end of crank arm 44 and is threadedly engaged with a nut 53 carried on the tool slide 50. Thus rotation of shaft 40 through 180° moves crank pin 44a through a 180° arc, the radius of which is relatively small and is adjustable by rotation of spindle 51 and consequent adjustment of tool slide 50. Crank pin 44a is rotatably received in a bearing 46a in the end of the connecting rod 46. The pivotal connection of this connecting rod to tongue 45 includes a pivot pin 49, which passes through either of two bearings 47 or 47a in said tongue and is fixed in either of three tapped openings 48, 48a or 48b in said connecting rod. Movement of crank pin 44a through its 180° arc pushes slide 12 to the right. As hereinafter fully explained, the position of the crank pin 44a determines the distance which the slide 12 travels on rotation of shaft 40, and consequently determines the enlargement ratio of the tracing on the platen in the longitudinal direction.

A relatively long connecting rod 54 is pivotally connected both to the crank arm 44 and to platen 13. The pivotal connection of this connecting rod to the crank arm includes a crank pin 44b which is fixed to said crank arm and in the starting position of the linkage is to the right of shaft 40. The eccentricity of crank pin 44b is much greater than that of crank pin 44a. Thus rotation of shaft 40 through 180° also moves crank pin 44b through a 180° arc, the radius of which is much greater than that of the 180° arc through which crank pin 44a moves. Crank pin 44b is rotatably received in a bearing 54b in the end of the connecting rod 54. This connecting rod is curved at 54a so that it can clear the tool slide 50 and connecting rod 46 when shaft 40 is rotated 180° from its starting position. Movement of crank pin 44b through its 180° arc thus pulls platen 13 to the left.

In the construction illustrated the machine can be adjusted for enlargement ratios of 10, 25 or 50 to 1, although it is obvious other ratios can be obtained by proper selection of connecting rod and crank arm lengths. The lengths of the connecting rod 54 and the eccentricity of the crank pin 44b are fixed so that the platen always moves a fixed distance on rotation of shaft 40. The different enlargement ratios are obtained by adjusting the effective length of the connecting rod 46 and the eccentricity of the crank pin 44a and thus adjusting the distance which the slide 12 moves. For an enlargement ratio of 10 to 1, the effective length of the connecting rod 46 is adjusted to one-tenth the fixed length of the connecting rod 54 and at the same time the eccentricity of crank pin 44a is adjusted to one-tenth the fixed eccentricity of crank pin 44b. Similarly for enlargement ratios of 25 or 50 to 1 the effective length of the connecting rod 46 is adjusted to one twenty-fifth or one-fiftieth the length of the connecting rod 54 and the eccentricity of the crank pin 44a is adjusted to one twenty-fifth or one-fiftieth the eccentricity of crank pin 44b.

When pivot pin 49 is fixed in opening 48 of the connecting rod 46, this connecting rod has an effective length one-tenth that of the connecting rod 54. When this pivot pin is fixed in opening 48a or 48b, the connecting rod 46 has an effective length one twenty-fifth or one-fiftieth that of the connecting rod 54. The bearing 47 in tongue 45 is used when the pivot pin is fixed in the opening 48 or 48a and the bearing 47a when this pin is fixed in the opening 48b to bring the slide 12 to the proper position with respect to the tracing point 16. In either event the eccentricity of the crank pin 44a, not that of the tongue, determines the distance of travel of the slide 12. Preferably the bearing 52 and the tool slide 50 have flat faces m and n directed toward each other. A gauge block G (Figure 11) can be inserted between these faces for determining the position of adjustment of the tool slide 50 to furnish any desired eccentricity of the crank pin 44a.

With reference to Figures 2, 5, 9 and 10, post 15, which mounts tracing lever 14, is preferably of C-shape in end elevation and has vertically adjustable antifriction bearings 55. Said bearings support a spindle 56 which has a central offset 56a (Figure 2) and carries tracing point 16 hereinbefore referred to. This tracing point is removable and replaceable for adjusting the transverse enlargement ratio. The shorter the tracing point, the greater the enlargement. Spindle 56 also carries the long arm of the tracing lever which extends back to the tracing slide and carries marking device 17, also hereinbefore referred to. For maintaining the tracing point in contact with the die passage, post 15 carries a fixed rod 57 and spindle 56 carries a spring wire 58 fixed to its offset 56a. A clamp 59 joins said rod and said wire. Wire 58 tends to remain straight and thus holds the tracing point against the surface of the die passage, but can flex as the tracing point moves in accordance with the contour of this passage. Optionally these last named parts can be omitted and the base can be canted slightly, thus maintaining the tracing point in contact with the die passage by gravity.

Preferably side members 18 of the base carry upstanding bearings 60 about midway of their length (Figures 1 and 2). These bearings rotatably support a cam 61 on which the long arm of tracing lever 14 rests.

In operation, stand 28 is set properly for the particular die, which is then clamped therein. In this position tracing point 16 contacts the die passage adjacent its outer end. Handle 42 is rotated counterclockwise as viewed in Figure 1 through approximately 180° from its starting position to the position shown in dot-dash lines. Such rotation moves slide 12 to the right through a distance which varies according to the ratio for which the machine is adjusted. During such movement of the slide tracing point 16 traverses the die passage. The transverse movement of the tracing point on the die surface moves marking device 17 proportionately, but by a much greater amount. At the same time the linkage moves platen 13 to the left but by a similar greater amount than the slide. Thus the marking device traces the profile of the die on the paper, but on a much larger scale which is the same both longitudinally and transversely. Since the locations of the pivotal connections of link 54 are fixed, the distance which the platen moves is always the same.

When the slide 12 and platen 13 move in opposite directions as illustrated, the tracing on the platen is reversed longitudinally from the actual die passage. Since the tracing lever 14 and the tracing point 16 constitute a lever of the first class, the tracing also is reversed transversely. Thus it is merely necessary to turn the tracing around to obtain a true enlarged profile of the die passage.

Stand 28 can be adjusted longitudinally of the slide to set the machine to different sizes and types of dies. The present invention provides a mechanism for determining the proper position of stand 28 for any particular die. With reference to Figure 6, said mechanism includes an upstanding plate 32 which is fixed to the top of the slide 12. The plate 32 has a depression 33 in the face opposite the die holder 29 for temporarily receiving the casing of a die D–1 for which the machine is to be set. A bearing 34 on the slide carries a slidable L-shaped gauging rod 35. One arm of rod 35 carries a gauge point 36 which is adapted to abut the end face of the nib of die D–1 and the other arm carries a set screw 37 which forms a stop adapted to abut stand 28. A spring 38 surrounds rod 35 and tends to force it to the left as viewed in Figure 6. To set the machine for die D–1, this die is held manually in depression 33. Gauge point 36 contacts the die nib and forces rod 35 to the right against the action of spring 38. The bearing 34 is equipped with a clamp screw 39 for fixing rod 35 in adjusted position. After said rod has been moved to its adjusted position, said clamp screw is turned to clamp the rod in this position. Next the die D–1 is transferred to the die holder 29 and clamped therein. Finally stand 28 is adjusted until it abuts the end of the set screw 37, at which position it is properly set for tracing a profile of the passage in the die D–1.

From the foregoing description it is seen that the present invention provides a simple and practical device for setting up the tracing machine for any particular die. The machine then accurately traces the die profile on an enlarged scale so that it can be measured easily.

While I have shown and described only a single embodiment of the invention, it is apparent that modifications may arise. Therefore, I do not wish to be limited to the disclosure set forth but only by the scope of the appended claims.

I claim:

1. In a machine for tracing profiles of die passages, a device for holding and positioning a die including a slide, a stand mounted on said slide, a die holder mounted on said stand, the position of said stand and said die holder being adjustable in at least one direction with respect to said slide, an upstanding plate fixed to said slide adjacent said stand and having a face whose plane is perpendicular to the direction of adjustment of said stand and a die receiving depression in said face, a gauging member supported on said slide and being slidably adjustable with respect to both said stand and said plate in the same direction as that in which said stand is adjustable, said gauging member being adapted to abut the nib of a die received in said depression and to abut said stand for positioning said die holder in accordance with the size and shape of the die in said depression, and means for clamping said gauging member in its adjusted position.

2. A device for holding and positioning dies including a slide, a stand mounted on said slide, a die holder mounted on said stand, the position of said stand and said die holder being adjustable in at least one direction with respect to said slide, an upstanding plate fixed to said slide adjacent said stand and having a face whose plane is perpendicular to the direction of adjustment of said stand and a die receiving depression in said face, a bearing mounted on said slide, a gauging rod mounted in said bearing and being slidably adjustable with respect to both said stand and said plate in the same direction as that in which said stand is adjustable, means on said gauging rod adapted to abut the nib of a die received in said depression, means on said gauging rod adapted to abut said stand for positioning said die holder in accordance with the size and shape of the die in said depression, and means on said bearing for clamping said gauging rod in its adjusted position.

3. In a profile tracing machine which includes a slide and die holding means mounted on said slide for adjustment in at least one direction, the combination therewith of a positioning device for said die holding means comprising a temporary die mounting means fixed to said slide and having a face which is adapted to be contacted by a die face and the plane of which is perpendicular to the direction of adjustment of said holding means, a gauging member supported on said slide and being slidably adjustable with respect to both said die holding means and said temporary mounting means in the same direction as that in which the former is adjustable, said gauging member having means adapted to abut the end face of the nib of a die in said temporary mounting means and means adapted to abut said holding means, and means for clamping said gauging member in its adjusted position.

4. In a profile tracing machine which includes a slide and die holding means mounted on said slide for adjustment in at least one direction, the combination therewith of a positioning device for said die holding means comprising an upstanding plate fixed to said slide and having a face whose plane is perpendicular to the direction of adjustment of said die holding means and a die receiving depression in said face, a bearing fixed to said slide, a gauging member mounted in said bearing and being slidably adjustable with respect to both said die holding means and said plate in the same direction as that in which said die holding means is adjustable, said gauging member having means adapted to abut the end face of the nib of a die in said depression and means adapted to abut said die holding means, and means on said bearing for clamping said gauging member in its adjusted position.

5. A tracing machine as defined in claim 4 in which said die holding means has a stepped die receiving socket for accommodating dies of different outside diameters.

References Cited in the file of this patent

UNITED STATES PATENTS

| Number | Name | Date |
|---|---|---|
| 56,164 | Berkeley | July 10, 1866 |
| 1,142,557 | Engel | June 8, 1915 |
| 1,232,701 | Locke | July 10, 1917 |
| 1,460,279 | Rosbach | June 26, 1923 |
| 2,545,784 | Kenner | Mar. 20, 1951 |
| 2,632,956 | Crosby | Mar. 31, 1953 |
| 2,637,118 | Graham | May 5, 1953 |